United States Patent
Takao et al.

(10) Patent No.: US 9,349,203 B2
(45) Date of Patent: May 24, 2016

(54) OPERATION SEQUENCE DISPLAY METHOD AND OPERATION SEQUENCE DISPLAY SYSTEM

(75) Inventors: Masataka Takao, Tokyo (JP); Katsuro Kamijo, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 446 days.

(21) Appl. No.: 13/701,084

(22) PCT Filed: Jan. 25, 2011

(86) PCT No.: PCT/JP2011/051259
§ 371 (c)(1),
(2), (4) Date: Feb. 11, 2013

(87) PCT Pub. No.: WO2011/152078
PCT Pub. Date: Dec. 8, 2011

(65) Prior Publication Data
US 2013/0141440 A1    Jun. 6, 2013

(30) Foreign Application Priority Data
Jun. 3, 2010 (JP) ................................. 2010-127715

(51) Int. Cl.
*G06T 13/00* (2011.01)
*G06T 19/20* (2011.01)
*G05B 19/042* (2006.01)

(52) U.S. Cl.
CPC .............. *G06T 13/00* (2013.01); *G05B 19/042* (2013.01); *G06T 19/20* (2013.01);
(Continued)

(58) Field of Classification Search
None
See application file for complete search history.

(56) References Cited

U.S. PATENT DOCUMENTS 5,377,319 A    12/1994   Kitahara et al.
7,546,602 B2 *  6/2009   Hejlsberg et al. ............. 719/313
(Continued)

FOREIGN PATENT DOCUMENTS

JP    08-056393 A    2/1996
JP    2002-006727 A    1/2002
(Continued)

OTHER PUBLICATIONS

Livingston, Mark A., et al. Evaluating system capabilities and user performance in the battlefield augmented reality system. Naval Research Lab Washington DC Virtual Reality Lab, 2004.*
(Continued)

*Primary Examiner* — Kee M Tung
*Assistant Examiner* — Xin Sheng
(74) *Attorney, Agent, or Firm* — Squire Patton Boggs (US) LLP

(57) ABSTRACT

Disclosed are an operation sequence display method and an operation sequence display system, wherein operation scenes to attach or remove one or a plurality of components are displayed by switching the scenes. And in at least one operation scene, the attachment or removal target components are displayed in a different manner from other components by changing gray scales using a single color, marking displays for emphasizing operation portions of the target components or the moving directions of the target components in the screen are blinked at a constant interval, and after the marking displays are blinked, the operations to the operation portions or the movements of the target components are displayed by animation, and displays regarding the operations to the operation portions or the movements of the target components are performed at a constant rhythm.

4 Claims, 26 Drawing Sheets

(52) U.S. Cl.
CPC ........... *G05B 2219/23129* (2013.01); *G05B 2219/24071* (2013.01); *G06T 2219/2008* (2013.01); *G06T 2219/2012* (2013.01)

(56) References Cited

U.S. PATENT DOCUMENTS

| | | | |
|---|---|---|---|
| 2008/0165210 A1* | 7/2008 | Platzer et al. ................. | 345/672 |
| 2009/0021576 A1* | 1/2009 | Linder ................. | G03B 37/00 |
| | | | 348/36 |
| 2010/0085355 A1 | 4/2010 | Nomura | |
| 2010/0131885 A1* | 5/2010 | Licato et al. ................. | 715/781 |
| 2011/0179624 A1* | 7/2011 | Sexton ............................ | 29/428 |

FOREIGN PATENT DOCUMENTS

| | | | | |
|---|---|---|---|---|
| JP | 2002-140142 A | 5/2002 | | |
| JP | 2003-085579 A | 3/2003 | | |
| JP | 2003085579 A | * 3/2003 | ............. | G06T 13/00 |
| JP | 2004-334510 A | 11/2004 | | |
| JP | 2005-070247 A | 3/2005 | | |
| JP | 2007-323353 A | 12/2007 | | |
| JP | 2008250813 A | * 10/2008 | | |

OTHER PUBLICATIONS

Notice of Allowance corresponding application JP2010-127715 dated Apr. 16, 2013.

International Search Report and Written Opinion mailed Mar. 8, 2011 corresponding to the International Patent Application No. PCT/JP21011/051259.

* cited by examiner

OPERATION SEQUENCE DISPLAY METHOD AND OPERATION SEQUENCE DISPLAY SYSTEM

TECHNICAL FIELD

The present invention relates to an operation sequence display method and an operation sequence display system for displaying an operation sequence to remove, install, or remove and install a plurality of components included in an apparatus, on a monitor controlled by a computer.

BACKGROUND ART

Efforts are being made to convert service/repair manuals such as automobile service manuals into electronic data. Manuals in the form of electronic data include a manual which displays, together with text descriptions, moving images generated by animation software as representative of processes of disassembling apparatus (Japanese Laid-Open Patent Publication No. 2002-140142) and a manual which displays moving images together with speech guidance (U.S. Pat. No. 5,377,319).

SUMMARY OF INVENTION

When a common defect to be repaired is found in some apparatus of a certain type due to a design error or the like, it is often necessary to distribute repair details and repair procedures to a plurality of dealers and repair shops throughout a wide area. Each of the dealers and the repair shops is required (1) to repair the apparatus accurately (accuracy) and (2) to establish a repair plan promptly at the same time as the others (promptness).

One solution to meet the requirement (1) is to produce an electronic manual which describes repair details and repair procedures using texts, speech, and moving images, and distribute a recording medium such as a CD-R or the like which stores the produced electronic manual to the dealers and the repair shops.

If the recording medium is to be distributed to a plurality of countries or regions where different languages are used, then the texts and speech need to be prepared in the different languages. However, the task of preparing texts and speech in different languages is highly time-consuming and costly. Time and cost impose enormous burdens if texts and speech have to be quickly distributed in different languages in attempts to meet the requirement (2) above. These problems are acute to manufacturers which manufacture or sell their products in a number of countries or regions (particularly, non-English-speaking countries or regions) over the world.

The present invention has been made in view of the above problems. It is an object of the present invention to provide an operation sequence display method and an operation sequence display system which are capable of effectively using animations to make the operator understand easily a procedure to remove and/or install a plurality of components.

According to the present invention, there is provided an operation sequence display method for displaying an operation sequence to remove, install, or remove and install a plurality of target components included in an apparatus, on a monitor controlled by a computer, comprising displaying, on the monitor, at least one operation scene showing installation or removal of one or more of the target components, displaying, in the operation scene, the target components and other components differently in monochromatic shades, blinking, at predetermined intervals in the operation scene, a displayed marking highlighting a position of an operation spot on the one or more target components or a direction along which to move the one or more target components or the operation spot, and after the displayed marking is blinked, displaying, in the operation scene, an animation showing an operation on the operation spot or a movement of the one or more target components or the operation spot, wherein the operation on the operation spot or the movement of the one or more target components or the operation spot is displayed in a constant rhythm.

With the operation sequence display method according to the present invention, animations are effectively used to make the operator easily understand operations to remove and/or install a plurality of components.

According to the present invention, specifically, one or more target components and other components are displayed differently in monochromatic shades. As the one or more target components displayed in a higher gradation level are highlighted, the operator finds it easy to grasp the one or more target components without speech and texts.

The position of an operation spot on the one or more target components or the direction along which to move the one or more target components or the operation spot is highlighted by a displayed marking, guiding the viewpoint of the operator to the one or more target components or the operation spot. Consequently, the possibility of overlooking the timing of the beginning of subsequent animations is lowered. Since the displayed markings are blinked at constant intervals, it is possible to increase the effect of guiding the viewpoint of the operator and the effect of making it easy to grasp the timing of beginning of animations without overlooking the same.

Inasmuch as operations on the operation spot or movement of the one or more target components or the operation spot is displayed in animations in a constant rhythm, it is possible to convey operation sequences to the operator in a stable rhythm and at a fast pace without disturbing the concentration of the operator.

If speech and texts are not used in carrying out the operation sequence display method, then the period of time required to prepare data for carrying out the operation sequence display method is reduced. As speech data and text data are not required, the amount of data used in the operation sequence display method is reduced, and no translation of speech data and text data is necessary. Therefore, the time and expenses for translation are not required, and the operation sequences can rapidly be sent to repair shops and dealers in countries or regions where different languages are used.

The blinking rhythm of the displayed marking and the running rhythm of the animation may be set to a common rhythmic base. Therefore, it is possible to convey operation sequences to the operator at a fast pace with an increased ability for the operator to keep the concentration stably.

The operation sequence display method may further comprise switchingly displaying a plurality of operation scenes, and switching from one of the operation scenes to another of the operation scenes by fading out the one of the operation scenes in timed relation to the rhythmic base common to the blinking of the displayed markings, and thereafter fading in the other of the operation scenes in timed relation to the rhythmic base common to the blinking of the displayed markings. Accordingly, the one operation scene switches smoothly to the other operation scene without making the operator feel uncomfortable, but allowing the operator to keep the concentration stably.

If a concealing component is positioned in front of and hides the operation spot on the one or more target components, the concealing component has only outer contour lines displayed, thereby displaying the operation spot as being seen through the concealing component. Therefore, even in the presence of the concealing component, it is possible to present guidance about the operation on the operation spot without the need for changing the viewpoint.

According to the present invention, there is also provided an operation sequence display system for displaying an operation sequence to remove, install, or remove and install a plurality of components included in an apparatus, on a monitor controlled by a computer, wherein the computer displays, on the monitor, at least one operation scene showing installation or removal of one or more or the target components, displays, in the operation scene, the one or more target components and other components differently in monochromatic shades, blinks, at predetermined intervals in the operation scene, a displayed marking highlighting a position of an operation spot on the one or more target components or a direction along which to move the one or more target components or the operation spot, and after the displayed marking is blinked, displays, in the operation scene, an animation showing an operation on the operation spot or a movement of the one or more target components or the operation spot, wherein the operation on the operation spot or the movement of the one or more target components or the operation spot is displayed in a constant rhythm.

With the operation sequence display system according to the present invention, animations are effectively used to make the operator easily understand operations to remove and/or install a plurality of components.

BRIEF DESCRIPTION OF DRAWINGS

FIG. 2 is a flowchart of an example of operations and processes carried out by each dealer terminal, each local company terminal, and a management server in the event that a repair work needs to be performed commonly for cars belonging to a certain car type, model code, model year, lot number, and the like;

DESCRIPTION OF EMBODIMENTS

A. Embodiment

1. Overall Arrangement

Figure 1:
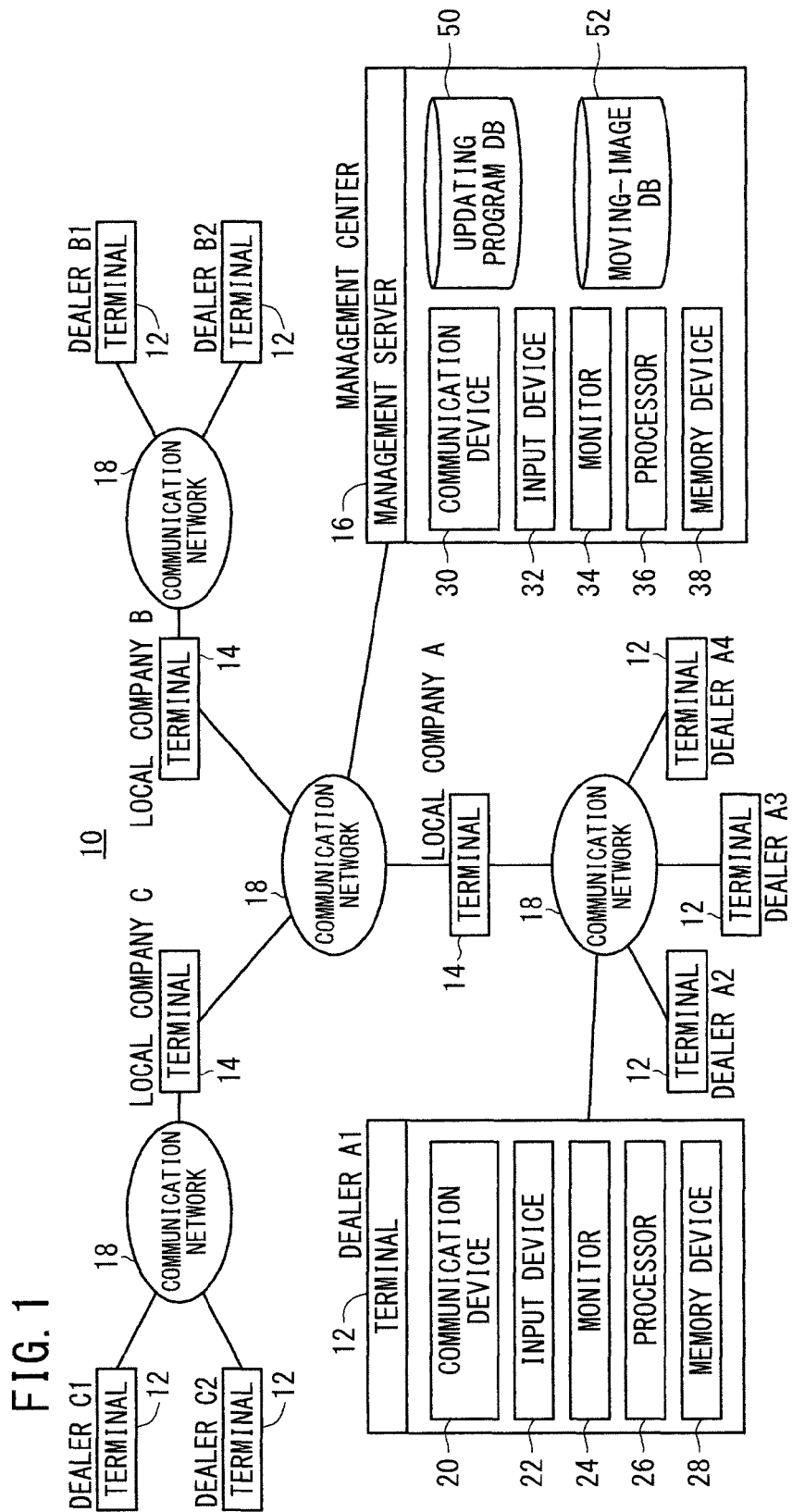
FIG. 1 is a block diagram of an operation sequence display system according to an embodiment of the present invention.

FIG. 1 is a block diagram of an operation sequence display system 10 (hereinafter also referred to as "system 10") according to an embodiment of the present invention.

The system 10 is able to give guidance about a repair work that is required commonly for cars belonging to a certain car type, model code, model year, lot number, and the like, to a plurality of dealers (e.g., dealers A1 through A4, B1, B2, C1, C2). The system 10 includes a plurality of dealer terminals 12 (hereinafter referred to as "terminals 12") installed at the respective dealers, a plurality of local company terminals 14 (hereinafter referred to as "terminals 14") installed respectively at a plurality of local companies (e.g., local companies A, B, C), and a management server 16 (hereinafter referred to as "server 16") installed at a management center. The terminals 12, 14 are positioned in a plurality of countries or regions in the world (e.g., Japan, East Asia, Southeast Asia, west Asia, north Asia, south Asia, North America, Central America, South America, north Europe, south Europe, west Europe, east Europe, Oceania, etc.). According to the present embodiment, the terminals 12, 14 and the server 16 can communicate with each other via a communication network 18 including the Internet, for example.

Each of the terminals 12 has a communication device 20, an input device 22 including a keyboard and a mouse, a monitor 24, a processor 26, and a memory device 28. The terminals 14 are of the same structure as the terminals 12.

The server 16 has a communication device 30, an input device 32, a monitor 34, a processor 36, a memory device 38, an updating program database 50 (hereinafter referred to as "updating program DB 50"), and a moving-image database 52 (hereinafter referred to as "moving-image DB 52").

The updating program DB 50 stores updating programs that are required commonly for cars belonging to car types, model codes, model years, lot numbers, and the like. The moving-image DB 52 stores moving-image data of repair works that are required commonly for cars belonging to car types, model codes, model years, lot numbers, and the like.

The functions of the components of the terminals 12, 14 and the server 16 will be described later.

2. Flow in the Event of a Repair Work

Figure 2:
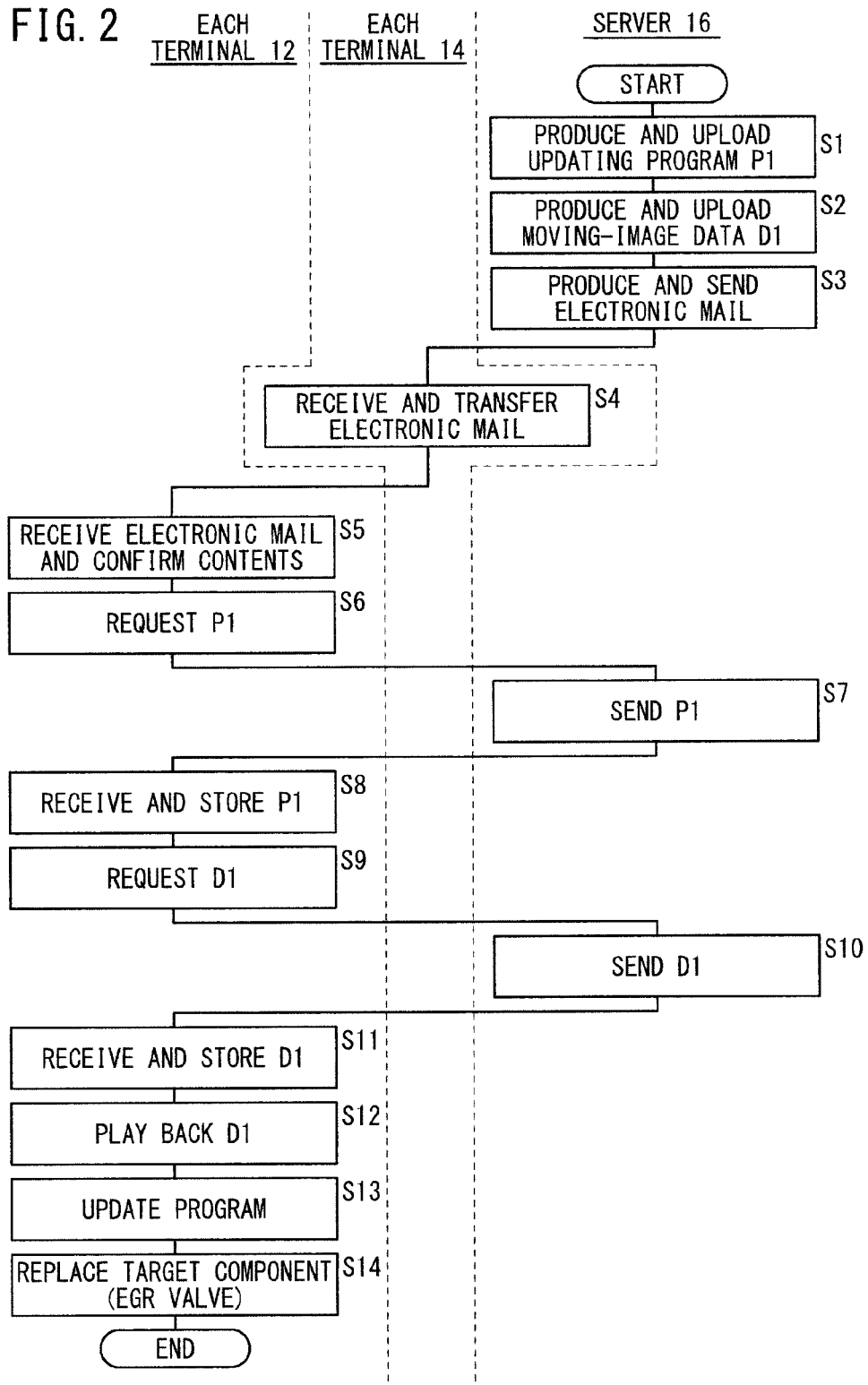

FIG. 2 is a flowchart of an example of operations and processes carried out by each of the terminals 12, each of the terminals 14, and the server 16 in the event that a repair work needs to be performed commonly for cars belonging to a certain car type, model code, model year, lot number, and the like. It is assumed, for example, that due to a defect of an electronic control unit (ECU), not shown, for an exhaust gas recirculation (EGR) device, a program for the ECU is to be updated, and a repair work is needed to replace an EGR valve 72 (see FIG. 6, etc.).

In an advance preparatory action, the administrator or the like of the server 16 obtains an updating program P1 for the ECU and moving-image data D1 for removing the EGR valve 72. The moving-image data D1 are data of an electronic manual for explaining an operation procedure for removing the EGR valve 72, and do not basically contain speech data and text data. However, the moving-image data D1 may at least one of speech data and text data as supplemental data.

In step S1, the administrator of the server 16 stores the updating program P1 for the ECU into the updating program DB 50 of the server 16 through the input device 32, thereby uploading the updating program P1.

In step S2, the administrator of the server 16 stores the moving-image data D1 into the moving-image DB 52 through the input device 32, thereby uploading the moving-image data D1. The contents of the moving-image data D1 will be described later.

In step S3, the administrator of the server 16 identifies local companies in countries or regions where cars to be repaired by the repair work have been sold, and sends, to the terminals 14 of the identified companies via the communication device 30, an electronic mail containing (1) a summary of the defect, (2) a message indicating that the program of the ECU needs to be updated and the EGR valve 72 needs to be replaced, (3) a message about a process of acquiring the updating program P1 (including a downloading password) and a process of updating the program, and (4) a message about a summary of a process of acquiring an electronic manual (moving-image data D1) for replacing the EGR valve 72 (including a downloading password).

For transmission to those terminals 14 that are present in a country where the server 16 is positioned, the electronic mail is prepared in the language of the country (e.g., Japanese). For transmission to those terminals 14 that are present in other countries, the electronic mail is prepared in a global language (e.g., English). Therefore, the administrator of the server 16 can prepare or obtain the electronic mail in a relatively short time. If the administrator of the server 16 can prepare or obtain the electronic mail written in other languages in a relatively short time and at a low cost, then the administrator of the server 16 may send the electronic mail in those other languages to the terminals 14 that are present in the countries where those other languages are used.

In step S4, each of the terminals 14 receives the electronic mail from the server 16 via the communication network 18 and a communication device, not shown. The person in charge at the local company confirms the contents of the electronic mail, and transfers the electronic mail from the terminal 14 to the terminals 12 of the dealers in the countries. If necessary, the person in charge may translate, partly or wholly, the electronic mail into the language of the country, and may add any comments that the local company thinks necessary.

In step S5, each of the terminals 12 receives the electronic mail from the terminal 14 via the communication network 18 and the communication device 20. The administrator or user of the terminal 12 confirms the contents of the received electronic mail. The administrator or user of the terminal 12 now knows the process of acquiring the updating program P1 and the process of updating the program, and the process of acquiring the electronic manual (moving-image data D1) for replacing the EGR valve 72.

In step S6, the administrator or user of the terminal 12 operates the input device 22 according to the contents of the electronic mail to send a request to ask the server 16 for the updating program P1 via the communication device 20.

In step S7, the server 16 automatically sends the updating program P1 to the communication device 20 of the terminal 12 according to the request from the terminal 12. For sending the updating program P1, the server 16 may request the terminal 12 to send a password for downloading the updating program P1, and may then send the updating program P1 after having confirmed that the password received by the server 16 is correct.

In step S8, the terminal 12 receives (downloads) the updating program P1 from the server 16 via the communication device 20, and stores the updating program P1 into the memory device 28 according to an input to the input device 22.

In step S9, the administrator or user of the terminal 12 operates the input device 22 according to the contents of the electronic mail to send a request to ask the server 16 for the moving-image data D1 via the communication device 20.

In step S10, the server 16 automatically sends the moving-image data D1 to the communication device 20 of the terminal 12 according to the request from the terminal 12. For sending the moving-image data D1, the server 16 may request the terminal 12 to send a password for downloading the moving-image data D1, and may then send the moving-image data D1 after having confirmed that the password received by the server 16 is correct.

In step S11, the terminal 12 receives (downloads) the moving-image data D1 from the server 16 via the communication device 20, and stores the moving-image data D1 into the memory device 28 according to an input to the input device 22.

The updating program P1 and the moving-image data D1 may be downloaded altogether, and a common password may be input once to permit the updating program P1 and the moving-image data D1 to be downloaded.

In step S12, the operator (the administrator, user, or another person at the terminal 12) operates the input device 22 to play back the moving-image data D1 stored in the memory device 28 and confirms the contents of the work (the contents of the moving-image data D1 will be described later).

In step S13, the operator updates the program of the ECU on a target car using the updating program P1 stored in the memory device 28. Specifically, the operator copies the updating program P1 from the terminal 12 to a program-updating portable device (not shown), and connect the program-updating portable device to the ECU on the target car. Then, the operator operates the program-updating portable device to update the program of the ECU.

In step S14, the operator replaces the EGR valve 72 according to the contents of the moving-image data D1.

3. Contents of the Moving-Image Data d1

Figure 3:
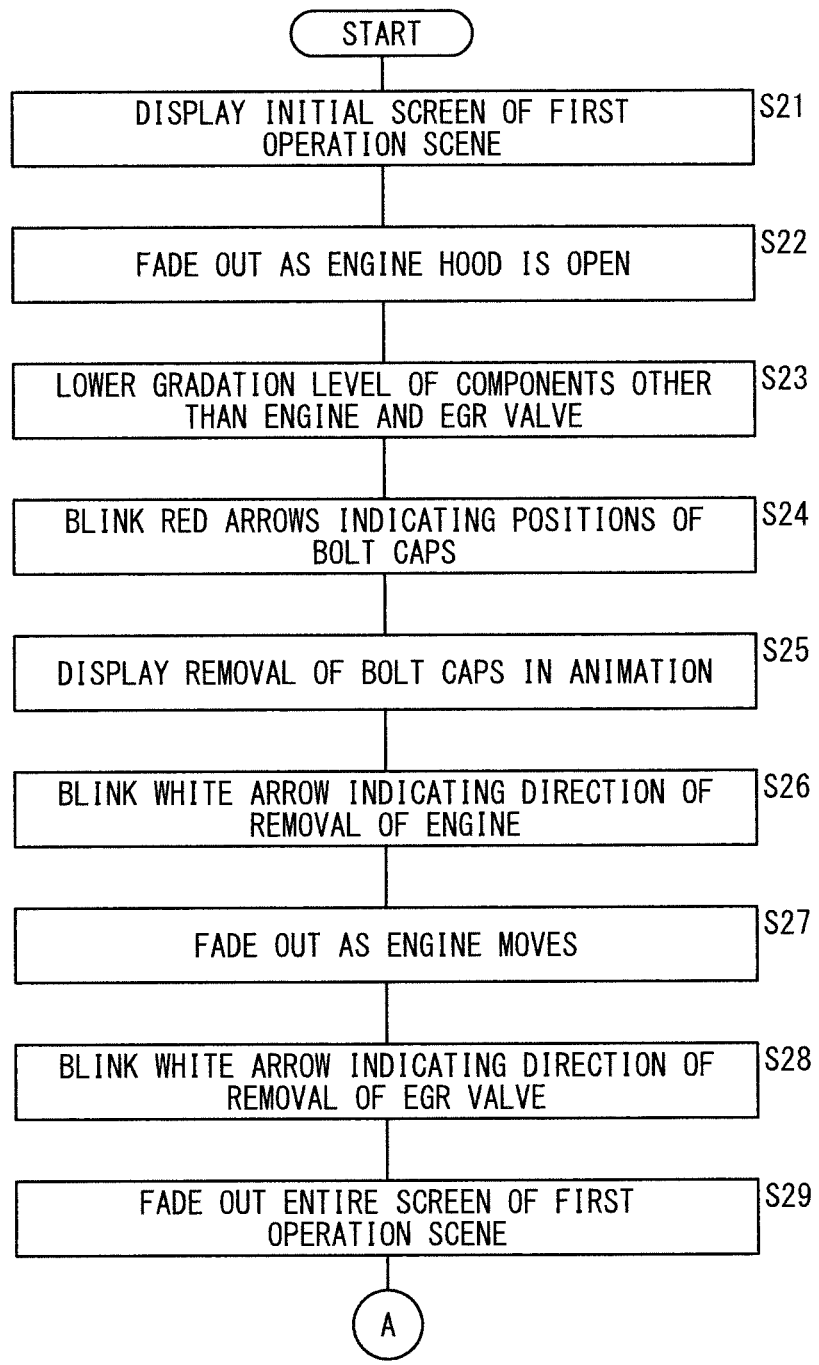
FIG. 3 is a flowchart of a portion of a process of playing back moving-image data.
Figure 4:
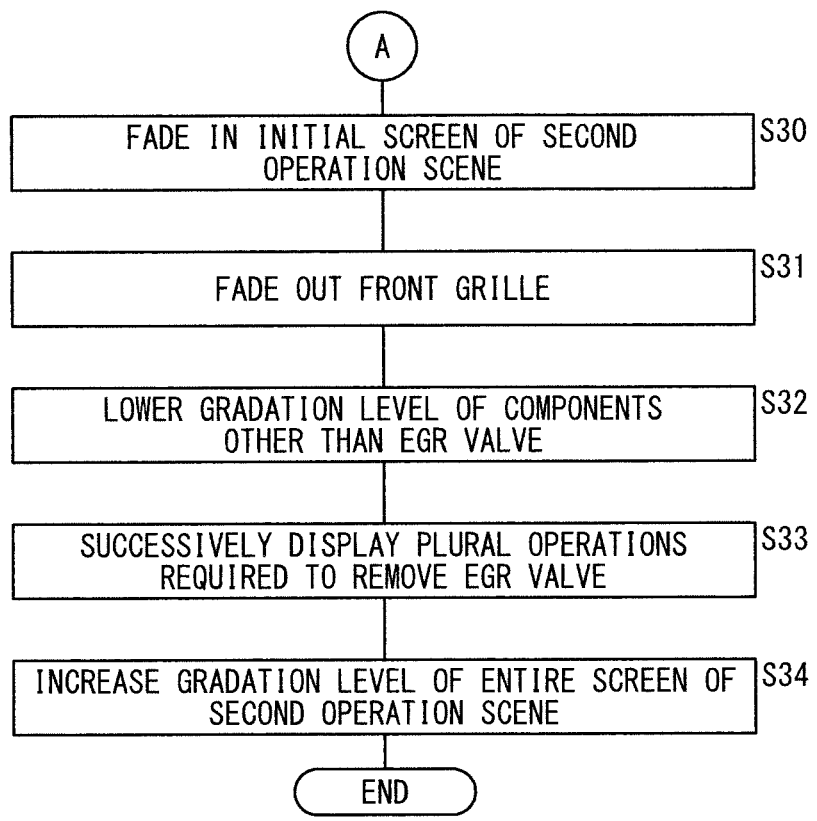
FIG. 4 is a flowchart of the remainder of the process of playing back moving-image data.
Figure 5:
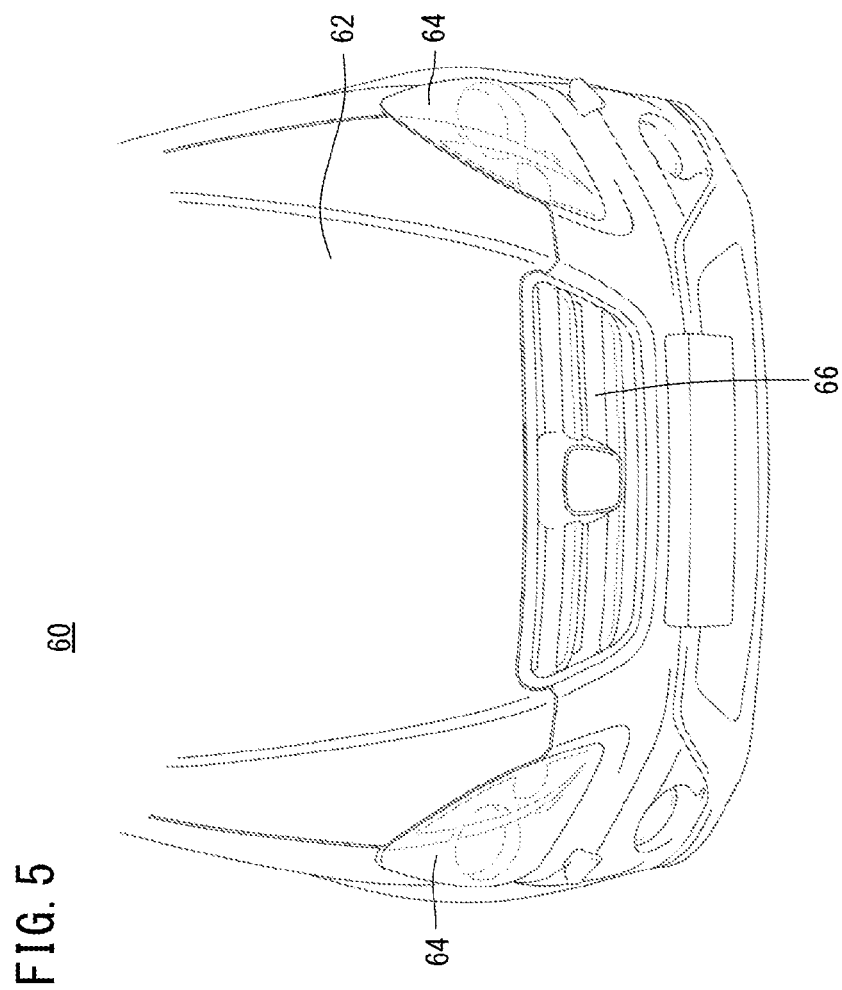
FIG. 5 is a view showing a first example of a screen displayed on a monitor when the moving-image data are played back.

FIGS. 3 and 4 are a flowchart of a process of playing back the moving-image data D1. For an easier understanding of the contents and important aspects of present invention, component of the work involved in replacing the EGR valve 72 is partly omitted from illustration. FIGS. 5 through 23 show examples of screens that are displayed on the monitor 24 when the moving-image data D1 are played back. The moving-image data D1 are played back when the processor 26 reads the moving-image data D1 from the memory device 28 and displays the moving-image data D1 on the monitor 24.

In step S21, the monitor 24 displays an initial screen (FIG. 5) of a first operation scene Sc1. The first operation scene Sc1 is a scene showing the removal of an engine 70 (FIG. 6) as a target component at the present time (present target component). The initial screen shows a front portion of a car 60 with an engine hood 62 closed. The initial screen is displayed as a whole in monochromatic shades (grayscale), with only headlights 64 being displayed in a light shade (gray) and the other portions in black.

Figure 6:
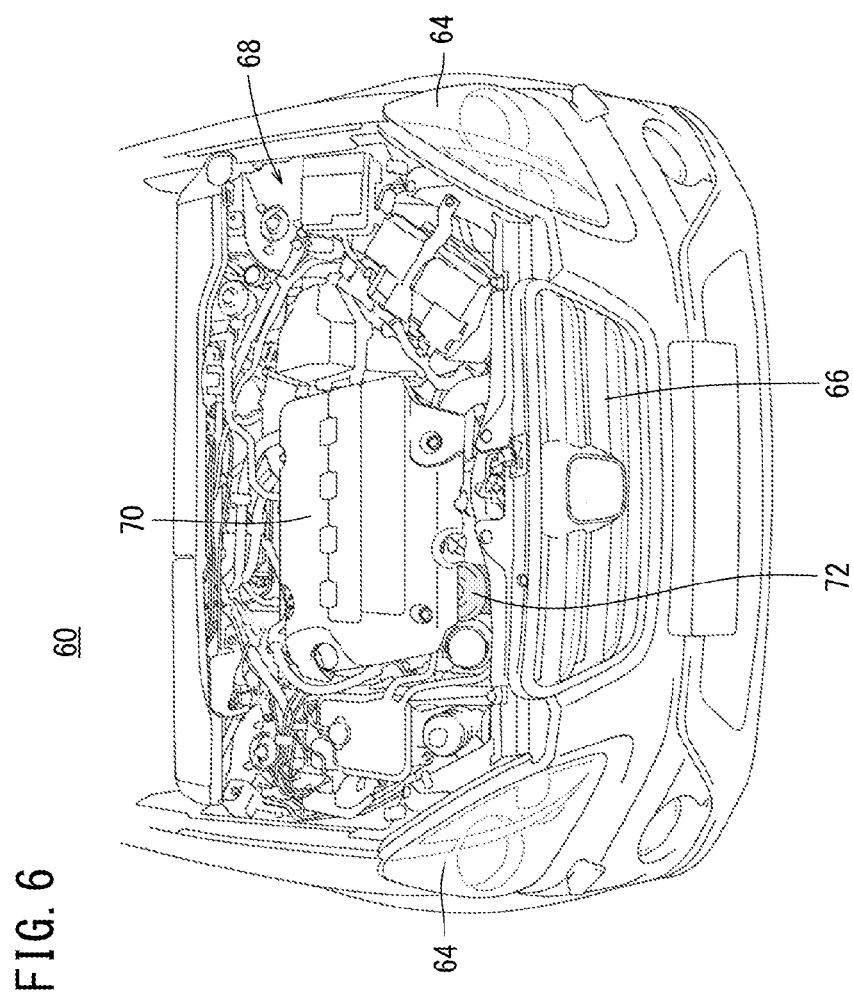
FIG. 6 is a view showing a second example of a screen displayed on the monitor when the moving-image data are played back.

In step S22, the monitor 24 displays the engine hood 62 as it opens and fades out with its lines gradually decreasing in gradation level. As a result, as shown in FIG. 6, an engine compartment 68 is exposed. Components within the engine compartment 68 are displayed in monochromatic lines of the same gradation level. However, the EGR valve 72, which is a final target component to be removed (final target component), has its surface displayed in gray.

Figure 7:
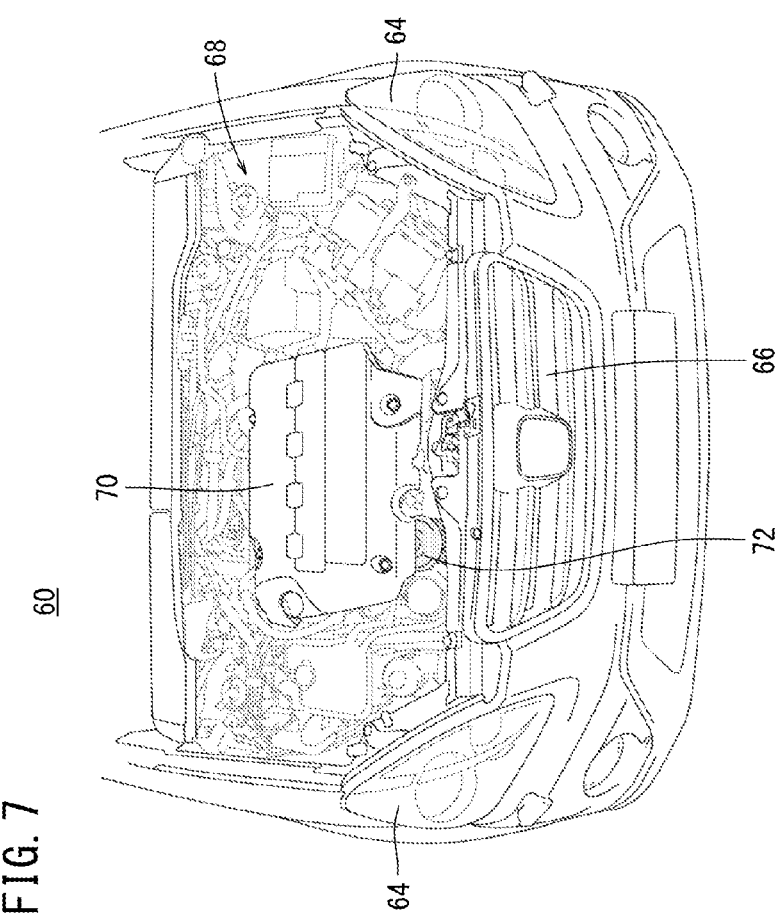
FIG. 7 is a view showing a third example of a screen displayed on the monitor when the moving-image data are played back.
Figure 8:
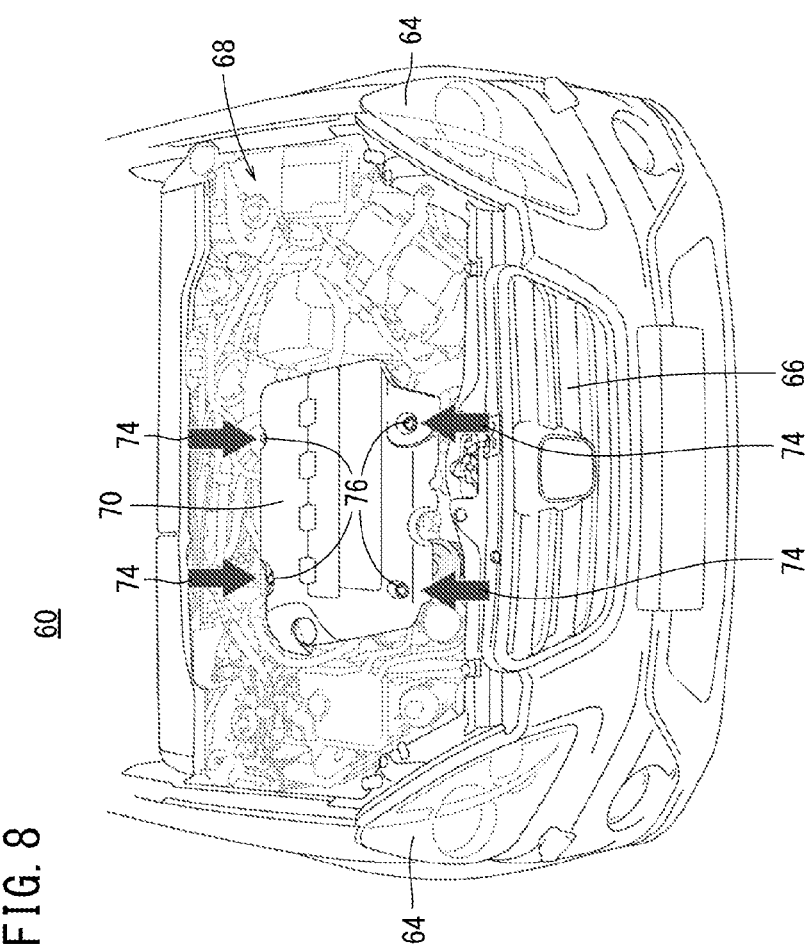
FIG. 8 is a view showing a fourth example of a screen displayed on the monitor when the moving-image data are played back.

In step S23, the monitor 24 displays the components within the engine compartment 68 as the lines representing the components other than the engine 70 and the EGR valve 72 are gradually reduced in gradation level (see FIG. 7). For example, if the lines representing the engine 70 and the EGR valve 72 are of the 256th gradation level (darkest) of a 256-gradation scale, then the lines representing the other components are of the 48th gradation level. Therefore, the engine 70 and the EGR valve 72 are highlighted.

In step S24, the monitor 24 displays a removal operation in relation to the engine 70 as the present target component. Specifically, red arrows 74 pointing the respective positions of four bolt caps 76 which secure the engine 70 in position are blinked three times by repeating a cycle of turning on the red arrows 74 for 0.5 second and turning off the red arrows 74 for 0.5 second three times (see FIG. 8). The red arrows 74 are colored in solid red, though not recognized in FIG. 8, indicating that the bolt caps 76 are going to be removed.

Figure 9:
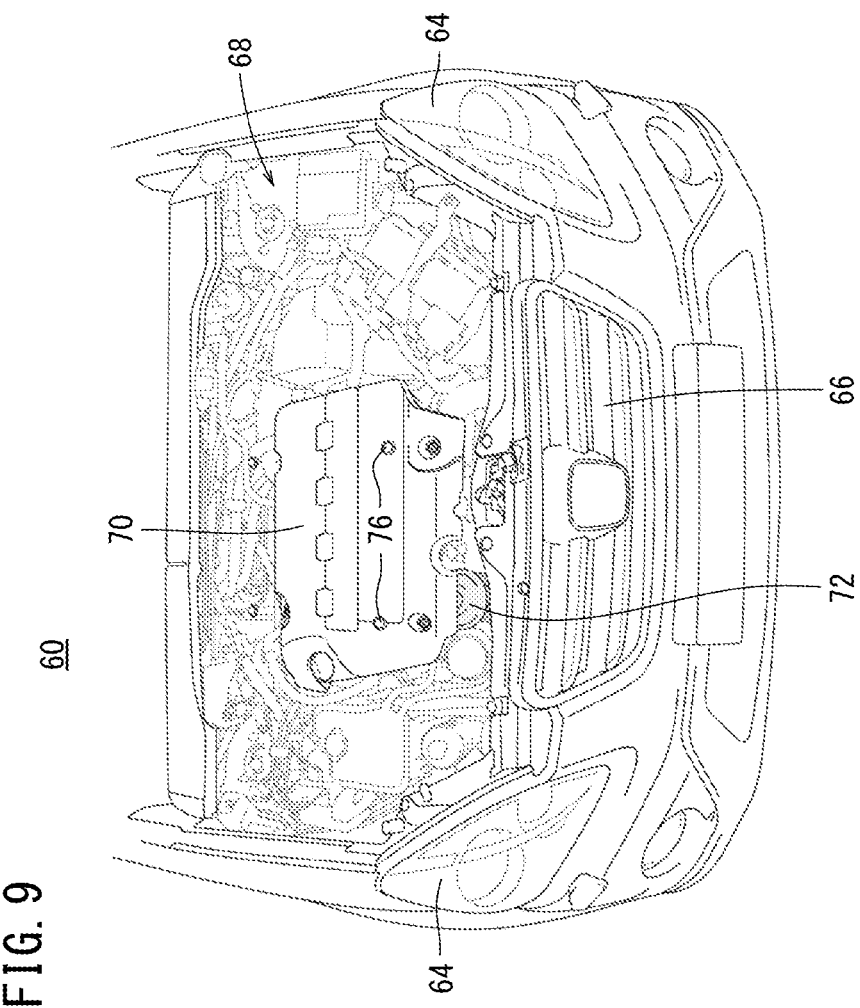
FIG. 9 is a view showing a fifth example of a screen displayed on the monitor when the moving-image data are played back.
Figure 10:
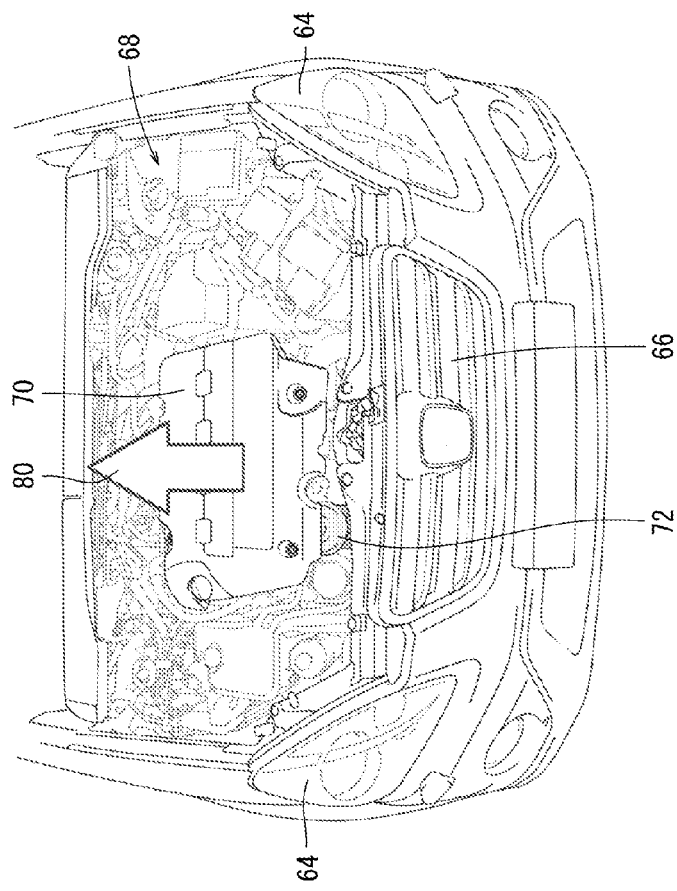
FIG. 10 is a view showing a sixth example of a screen displayed on the monitor when the moving-image data are played back.
Figure 11:
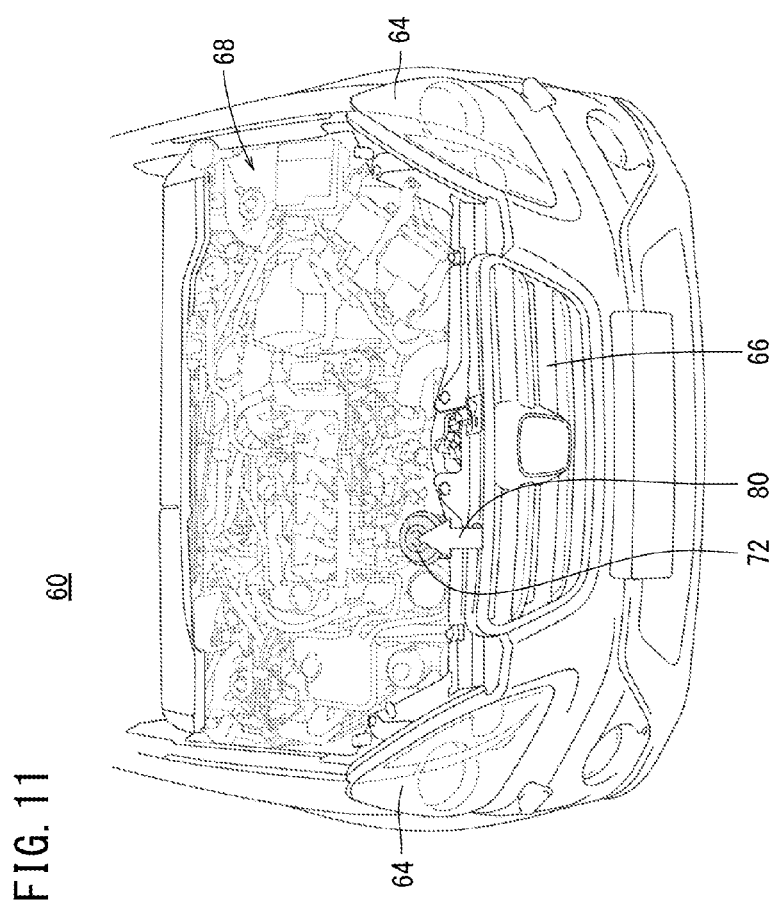
FIG. 11 is a view showing a seventh example of a screen displayed on the monitor when the moving-image data are played back.

In step S25, the monitor 24 displays an animation showing the manner in which the bolt caps 76 are removed from the engine 70 (see FIG. 9). The removed bolt caps 76 are faded out.

In step S26, the monitor 24 displays an operation to remove (move) the engine 70. Specifically, a white arrow 80 representative of a direction along which to remove (move) the engine 70 is blinked three times by repeating a cycle of turning on the white arrow 80 for 0.5 second and turning off the white arrow 80 for 0.5 second three times (see FIG. 10). The white arrow 80 has a frame displayed in red and an inner area displayed in white, for example, and indicates the direction along which to move the engine 70.

In step S27, the monitor 24 shows the engine 70 as it starts moving upwardly on the screen 0.5 second after the white arrow 80 has disappeared. While the engine 70 is moving, the lines indicating the engine 70 are gradually reduced in gradation level until the engine 70 fades out. As a result, only the EGR valve 72 is displayed at the highest gradation level in the engine compartment 68.

In step S28, the monitor 24 displays an operation to remove (move) the EGR valve 72 as a next target component (final target component). Specifically, a white arrow 80 representative of a direction along which to remove (move) the EGR valve 72 is blinked three times by turning on and off the white arrow 80 in the same manner as described above (see FIG. 11). As with the white arrow 80 in FIG. 10, the white arrow 80 has a frame displayed in red and an inner area displayed in white, for example, and indicates the direction along which to move the EGR valve 72. On the first operation scene Sc1, however, the EGR valve 72 is not actually moved, but its removal is preannounced.

Figure 12:
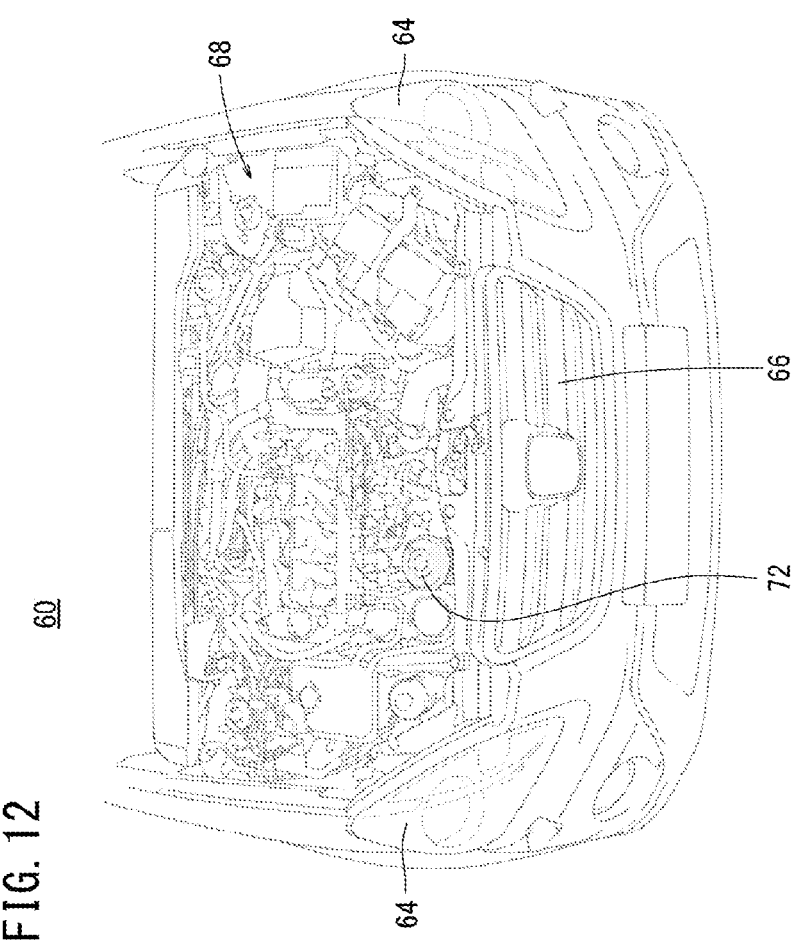
FIG. 12 is a view showing an eighth example of a screen displayed on the monitor when the moving-image data are played back.

In step S29, the monitor 24 displays the lines on the entire screen as they gradually decrease in gradation level (FIG. 12). The car 60 is faded out until it finally disappears in its entirely from the screen.

Figure 13:
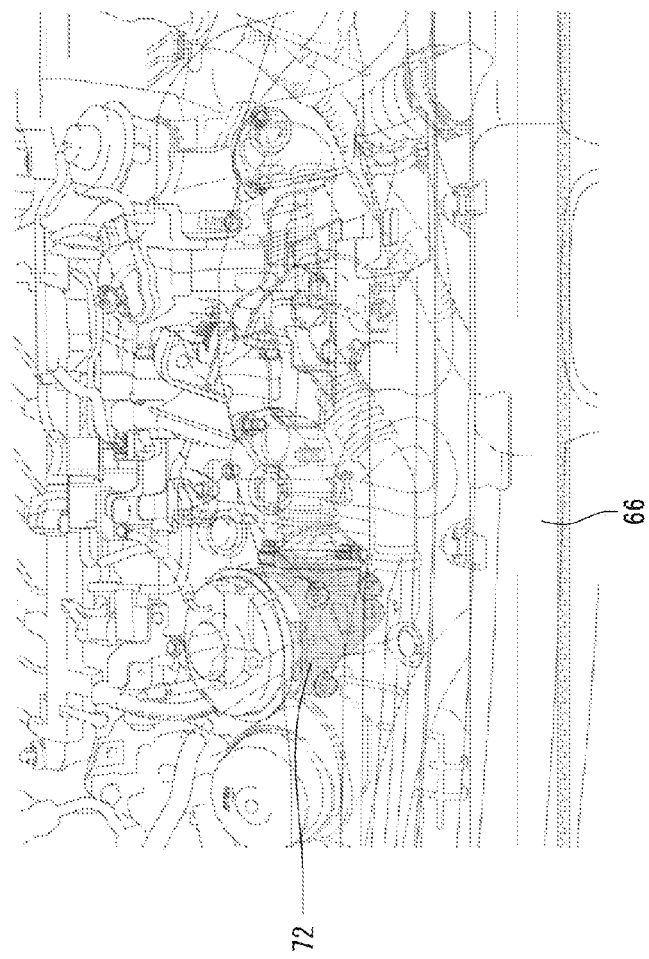
FIG. 13 is a view showing a ninth example of a screen displayed on the monitor when the moving-image data are played back.
Figure 14:
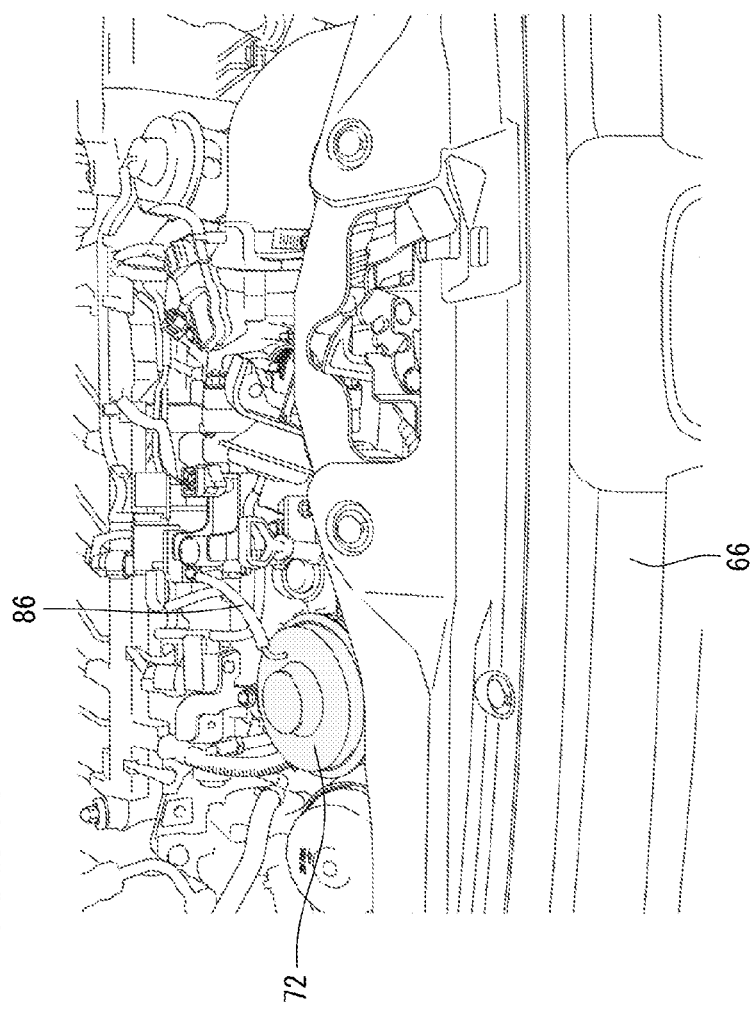
FIG. 14 is a view showing a tenth example of a screen displayed on the monitor when the moving-image data are played back.

In step S30 shown in FIG. 4, the monitor 24 displays the lines that start decreasing in graduation level 0.5 second after the white allow 80 has disappeared, and thereafter displays an initial screen of a second operation scene Sc2 as it fades in (see FIG. 13). The second operation scene Sc2 is a scene showing the removal of the EGR valve 72 as a target component (final target component according to the present embodiment), following the first operation scene Sc1. On a screen (FIG. 14) displayed when the fade-in is completed, the EGR valve 72 is hidden behind a front grille 66. The screen shown in FIG. 14 is displayed as a whole in monochromatic shades (grayscale), with all the components being displayed in black (e.g., of the 256th gradation level of a 256-gradation scale).

Figure 15:
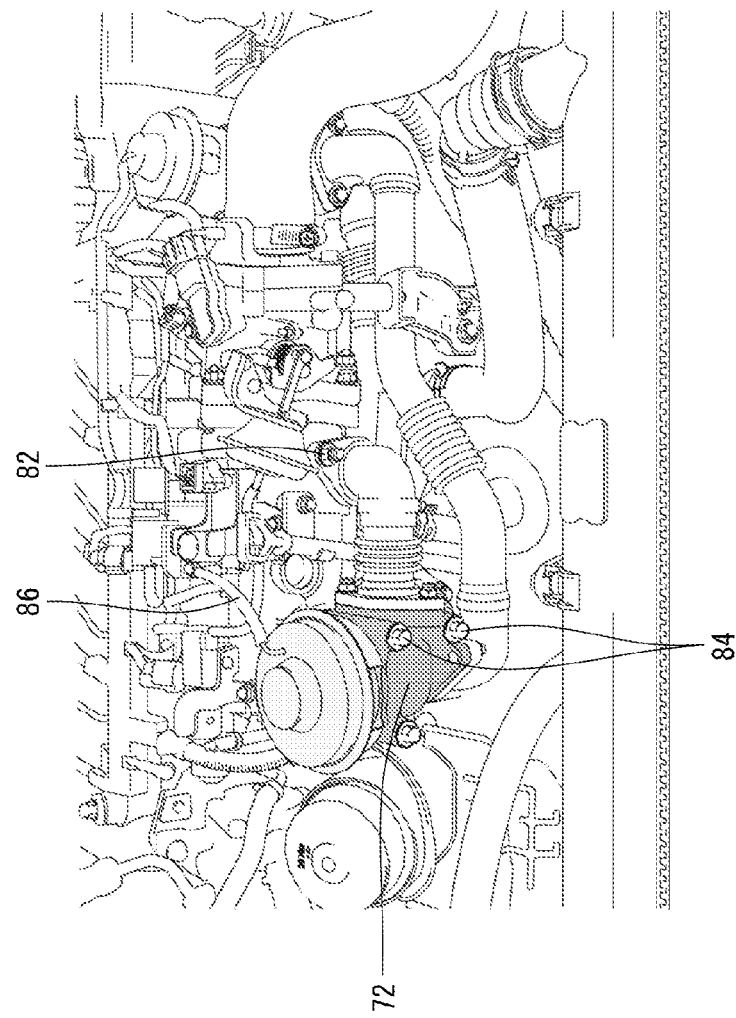
FIG. 15 is a view showing an eleventh example of a screen displayed on the monitor when the moving-image data are played back.

In step S31, the monitor 24 displays the front grille 66 hiding the EGR valve 72 as it fades out until the EGR valve 72 is exposed (see FIG. 15).

Figure 16:
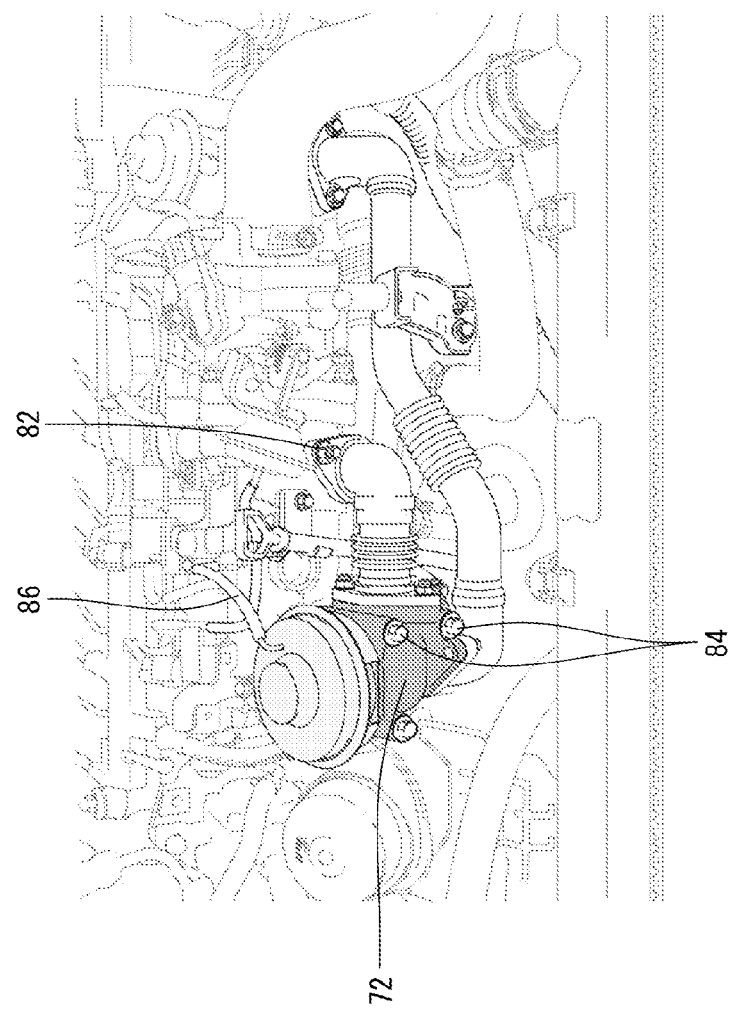
FIG. 16 is a view showing a twelfth example of a screen displayed on the monitor when the moving-image data are played back.

In step S32, the monitor 24 displays the components within the engine compartment 68 as the lines representing the components other than the EGR valve 72 are gradually reduced in gradation level (see FIG. 16). For example, if the lines representing the EGR valve 72 are of the 256th gradation level (darkest) of a 256-gradation scale, then the lines representing the other components are of the 48th gradation level. Therefore, the EGR valve 72 is highlighted.

In step S33, a plurality of operations required to remove the EGR valve 72 are successively displayed on the second operation scene Sc2. Components to be removed and kept out of the engine compartment 68 (nuts 82, bolts 84, etc. in FIGS. 16 and 17) are displayed in an animation which shows their positions by blinking red arrows 74 three times, in the same manner as described above, and thereafter shows their actual removal by starting to move the components 0.5 second after the red arrows 74 are turned off. Components to be removed and kept within the engine compartment 68 (a tube 86, etc. in FIG. 16) are displayed in an animation which shows directions along which to remove (move) them by blinking white arrows 80, in the same manner as described above, and thereafter shows their actual removal 0.5 second after the white arrows 80 are turned off (the lines indicating the components are reduced in gradation level after they are removed or while they are being removed).

Figure 17:
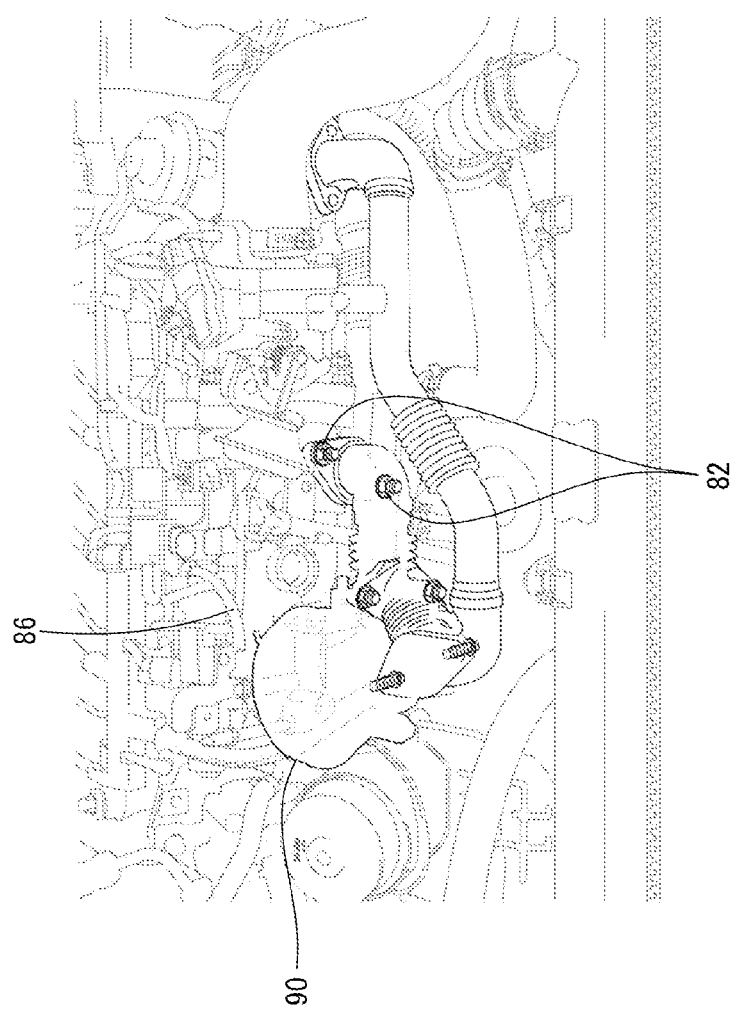
FIG. 17 is a view showing a thirteenth example of a screen displayed on the monitor when the moving-image data are played back.
Figure 18:
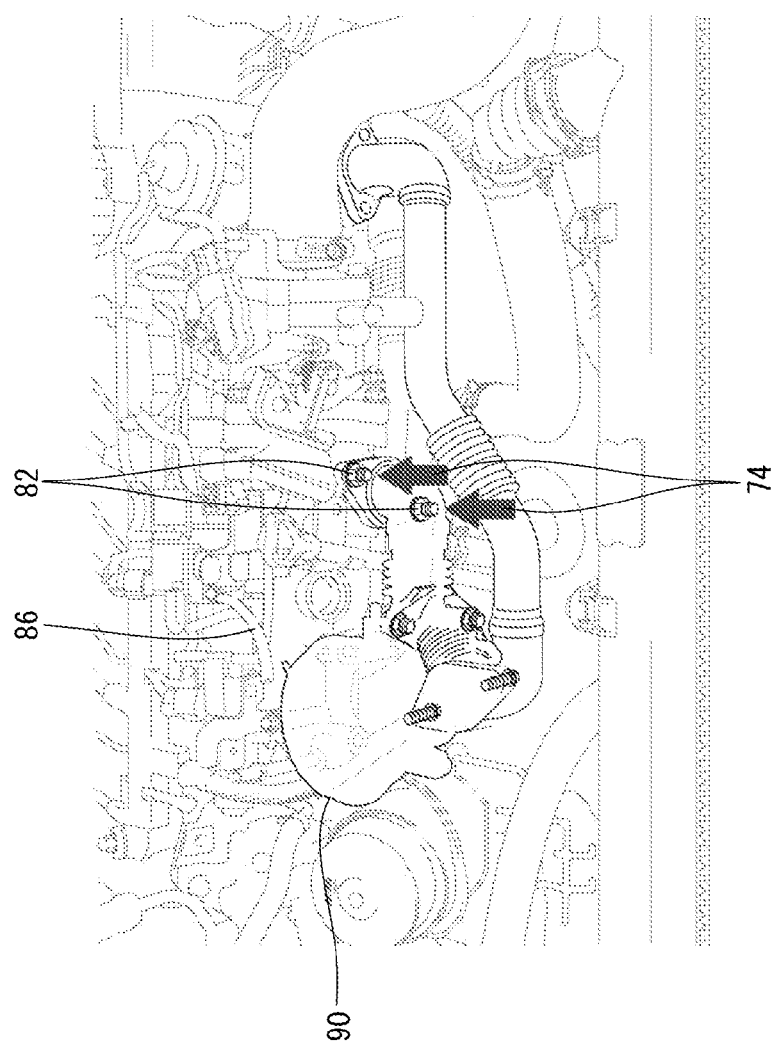
FIG. 18 is a view showing a fourteenth example of a screen displayed on the monitor when the moving-image data are played back.
Figure 19:
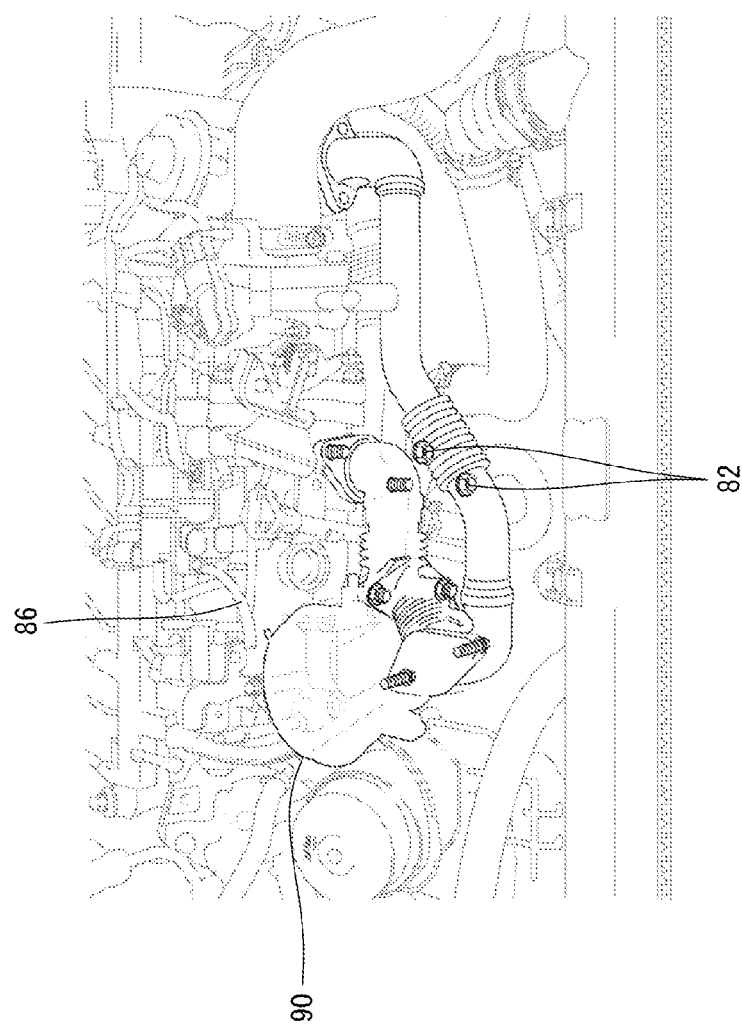
FIG. 19 is a view showing a fifteenth example of a screen displayed on the monitor when the moving-image data are played back.
Figure 20:
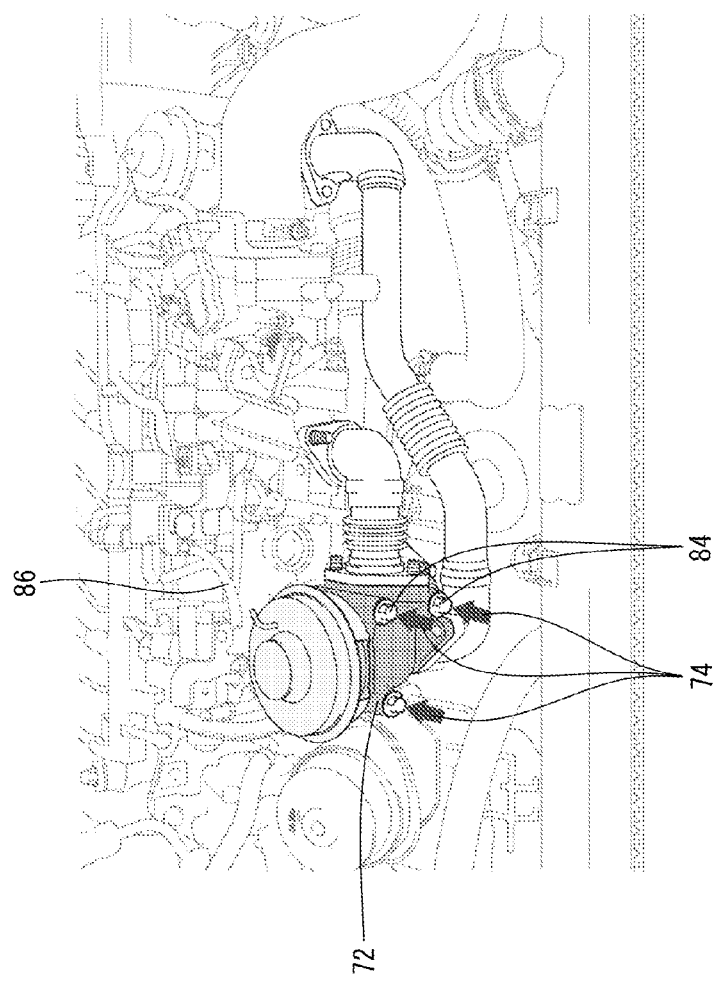
FIG. 20 is a view showing a sixteenth example of a screen displayed on the monitor when the moving-image data are played back.
Figure 21:
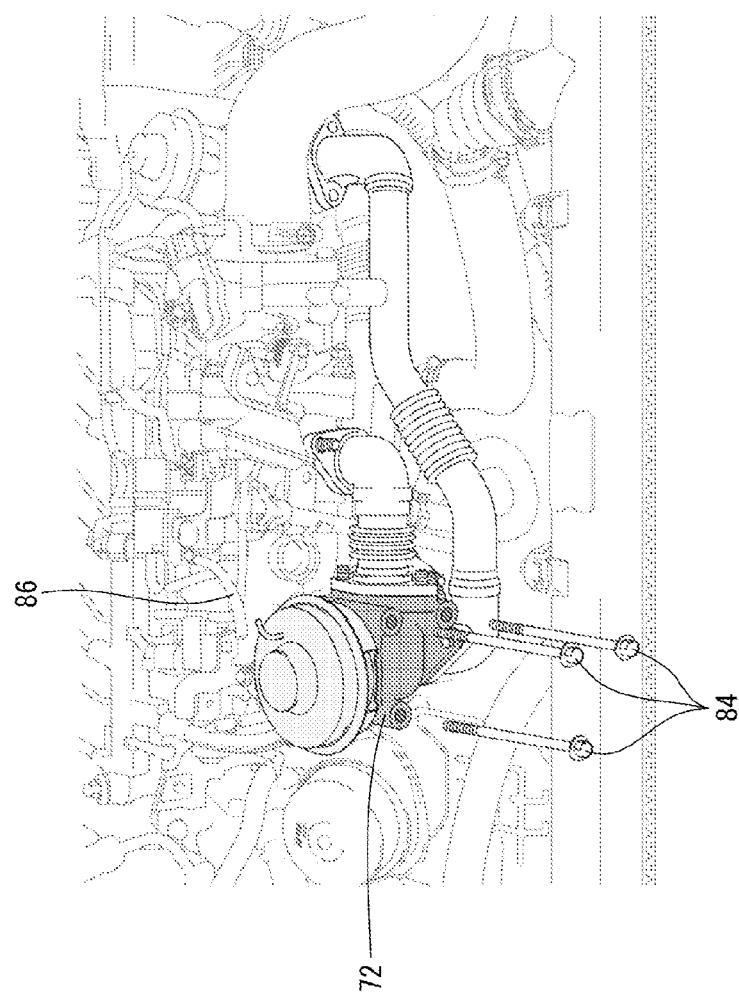
FIG. 21 is a view showing a seventeenth example of a screen displayed on the monitor when the moving-image data are played back.
Figure 22:
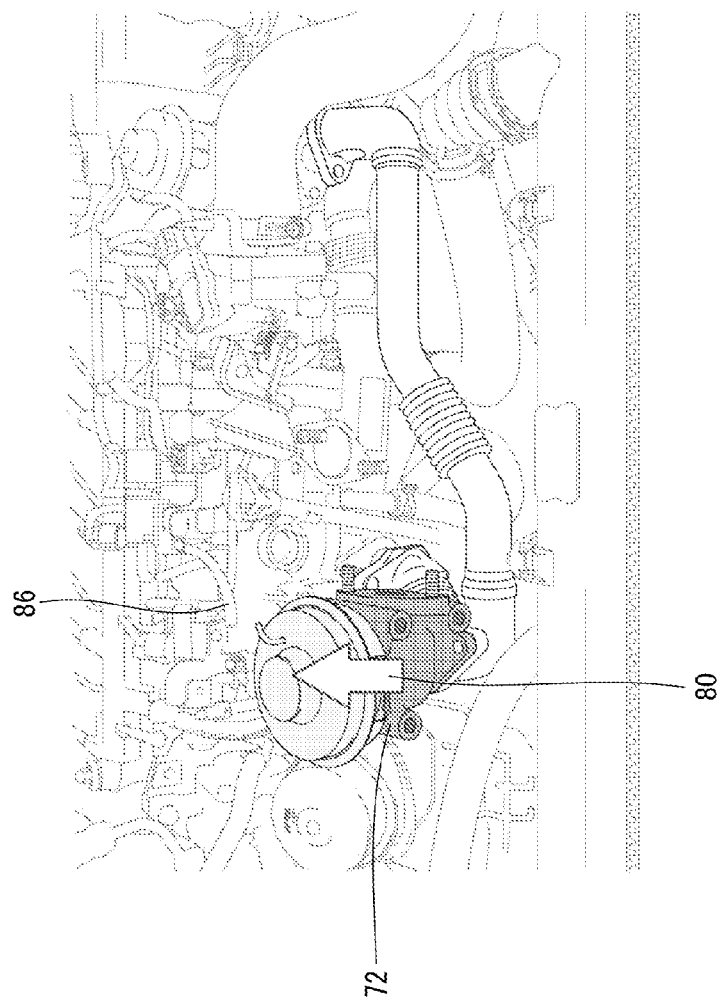
FIG. 22 is a view showing an eighteenth example of a screen displayed on the monitor when the moving-image data are played back.
Figure 23:
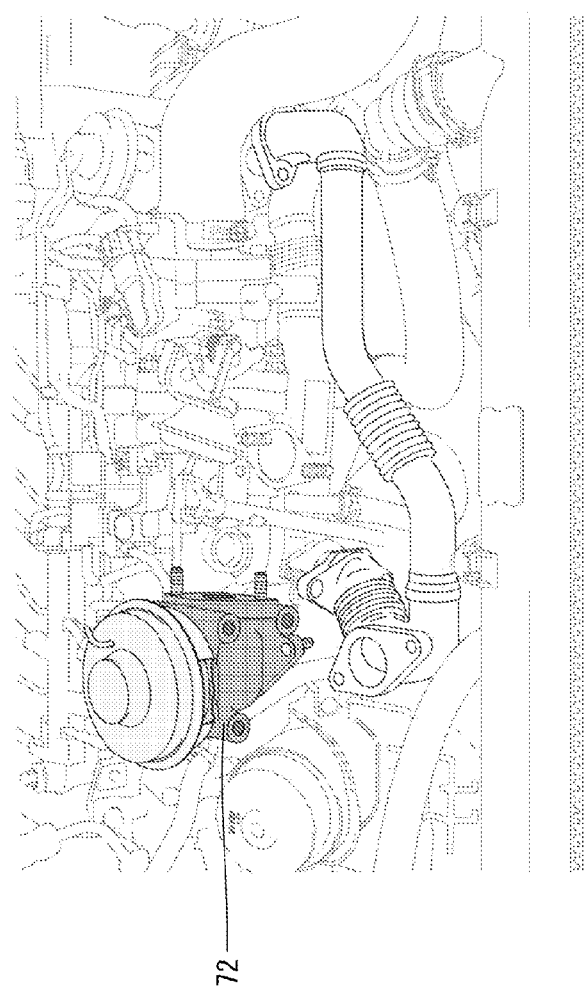
FIG. 23 is a view showing a nineteenth example of a screen displayed on the monitor when the moving-image data are played back.

For example, if two nuts 82, one of which is hidden behind the EGR valve 72, are to be removed, a concealing component that hides the nut 82 behind the EGR valve 72 has only its outer contour lines 90 displayed (see FIG. 17). Before the outer contour lines 90 are displayed, the concealing component has faded out. Then, red arrows 74 indicative of the positions of the nuts 82 to be removed are blinked three times as described above (see FIG. 18). Upon elapse of 0.5 second after the red arrows 74 are turned off, an animation showing the actual removal of the nuts 82 is displayed (see FIG. 19).

For removing the bolts 84 which secure the EGR valve 72 in position, red arrows 74 indicative of the positions of the bolts 84 are blinked three times as described above (see FIG. 20). Upon elapse of 0.5 second after the red arrows 74 are turned off, an animation showing the actual removal of the bolts 84 is displayed (see FIG. 21). The removed bolts 84 are faded out. Then, the monitor 24 displays an operation to remove (move) the EGR valve 72. Specifically, a white arrow 80 representative of a direction along which to remove (move) the EGR valve 72 is blinked three times as described above (see FIG. 22). As with the white arrow 80 in FIG. 10, the white arrow 80 has a frame displayed in red and an inner area displayed in white, for example, and indicates the direction along which to move the EGR valve 72. Upon elapse of 0.5 second after the white arrow 80 is turned off, the monitor 24 displays an animation showing the removal of the EGR valve 72 (see FIG. 23).

When the removal of the EGR valve 72 is completed on the screen, in step S34 shown in FIG. 4, the monitor 24 increases the gradation level of the lines (to the highest level) on the overall screen showing the second operation scene, indicating that the explanation of the work is finished.

Figure 24:
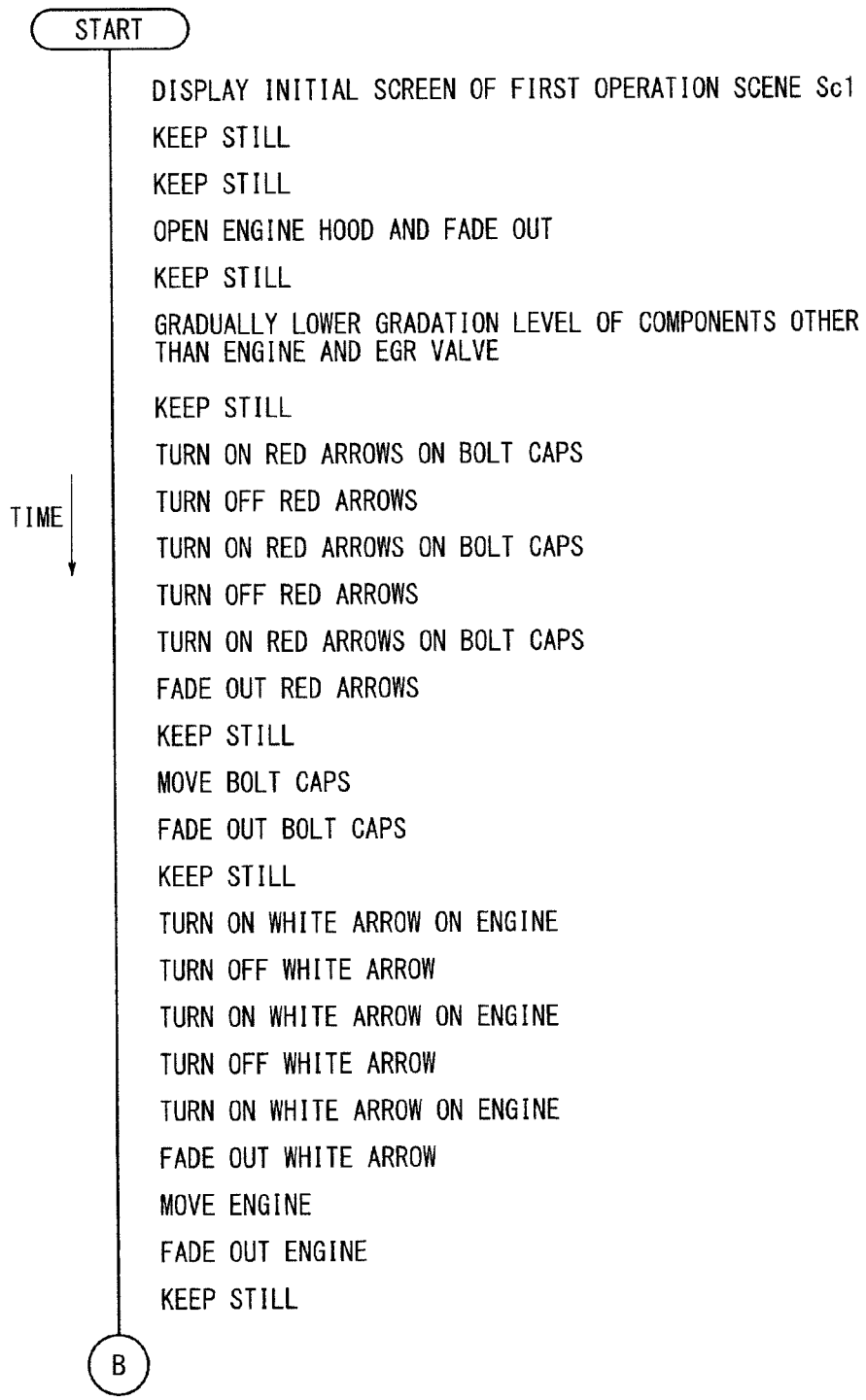
FIG. 24 is a diagram showing a time sequence of some of events displayed on the monitor from a first operation scene to a second operation scene.
Figure 25:
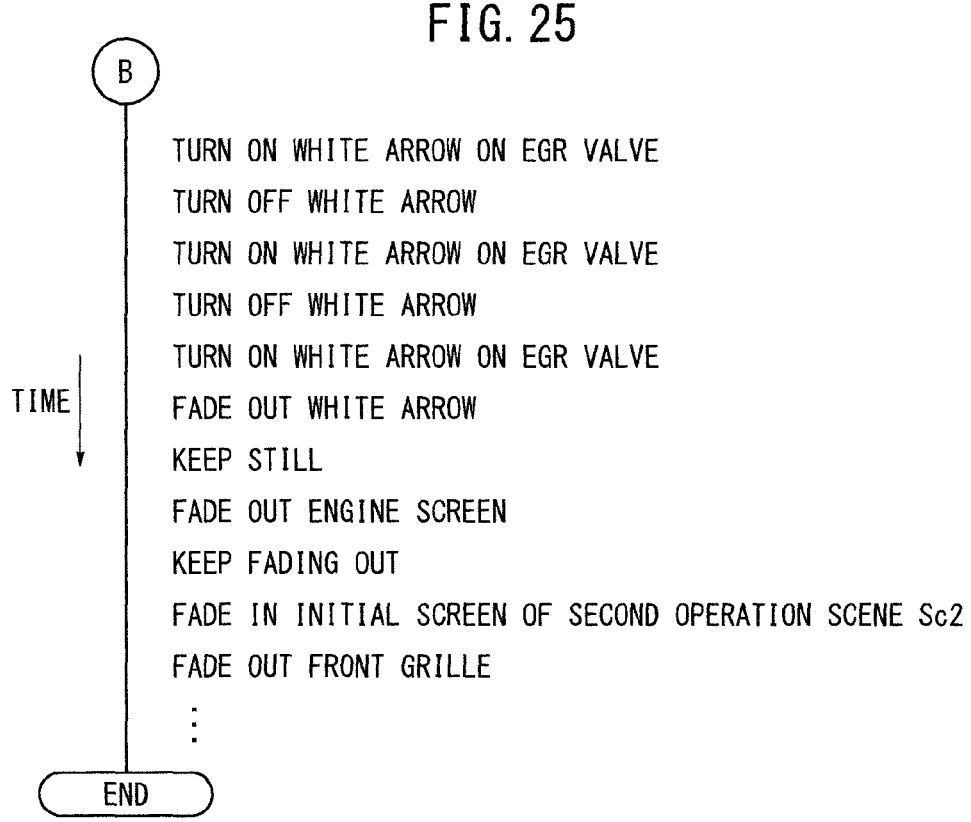
FIG. 25 is a diagram showing a time sequence of the remainder of events displayed on the monitor from the first operation scene to the second operation scene.

FIGS. 24 and 25 show time sequences of events displayed on the monitor 24 from the first operation scene Sc1 to the second operation scene Sc2. In FIGS. 24 and 25, each line represents an event that occurs for a time which is set to 0.5 second or a substantially integral multiple of 0.5 second. According to the present embodiment, the various events are displayed in a certain rhythm.

4. Advantages of the Present Embodiment

According to the present embodiment, animations are effectively used to make the operator easily understand operations to remove and/or install a plurality of components (the engine 70 and the EGR valve 72).

Specifically, according to the present embodiment, target components (the engine 70 and the EGR valve 72) and other components are displayed differently in monochromatic shades. As the target components displayed in a higher gradation level (the engine 70 and the EGR valve 72) are highlighted, the operator finds it easy to grasp the target components without speech and texts.

The positions of operation spots (the bolt caps 76, the nuts 82, the bolts 84, etc.) on the target components (the engine 70 and the EGR valve 72) are highlighted by the red arrows 74, and the directions along which to move the target components (the engine 70 and the EGR valve 72) or operation spots (the tube 84, etc.) are highlighted by the white arrows 80, guiding the viewpoint of the operator to the target components or the operation spots. Consequently, the possibility of overlooking the timing of the beginning of subsequent animations is lowered. Since the red arrows 74 and the white arrows 80 are blinked at constant intervals (see FIGS. 24 and 25), it is possible to increase the effect of guiding the viewpoint of the operator and the effect of making it easy to grasp the timing of beginning of animations without overlooking the same.

Inasmuch as operations on the operation spots or movements of the target components or the operation spots are displayed in animations in a constant rhythm (see FIGS. 24 and 25), it is possible to convey operation sequences to the operator in a stable rhythm and at a fast pace without disturbing the concentration of the operator.

If the moving-image data D1 do not contain speech data and text data, the period of time required to prepare the moving-image data D1 is reduced. As speech data and text data are not required, the amount of moving-image data D1 is reduced, and no translation of speech data and text data is necessary. Therefore, the time and expenses for translation are not required, and the operation sequences can rapidly be sent to repair shops and dealers in countries or regions where different languages are used.

According to the present embodiment, furthermore, since the screens on the monitor 24 are monochromatically displayed, the visual fatigue of the operator is reduced.

According to the present embodiment, the blinking rhythm of the red arrows 74 and the white arrows 80 and the running rhythm of the animations are set to a common rhythmic base (reference) (see FIGS. 24 and 25). Therefore, it is possible to convey operation sequences to the operator at a fast pace with an increased ability for the operator to keep the concentration stably.

According to the present embodiment, when the first operation scene Sc1 switches to the second operation scene Sc2, the screen of the first operation scene Sc1 fades out in timed relation to the rhythmic base common to the blinking of the red arrows 74 and the white arrows 80, and thereafter the screen of the second operation scene Sc2 fades in in timed relation to the rhythmic base common to the blinking of the red arrows 74 and the white arrows 80. Accordingly, the first operation scene Sc1 switches smoothly to the second operation scene Sc2 without making the operator feel uncomfortable, but allowing the operator to keep the concentration stably.

According to the present embodiment, the concealing component that is positioned in front of and hides a nut 82 has only its outer contour lines 90 displayed, thus displaying the nut 82 as being seen through the concealing component. Therefore, even in the presence of the concealing component, it is possible to present guidance about the operation on the nut 82 without the need for changing the viewpoint.

B. Modifications

The present invention is not limited to the above embodiment, but may employ various arrangements based on the description of the present specification. For example, the present invention may employ the following arrangements:

In the above embodiment, the car 60 (four-wheeled automobile) is described as a target to be repaired. However, the present invention may have a mobile object such as a two-wheeled automobile, an electric bicycle, an aircraft, a ship, a helicopter, etc. as an object to be repaired. Alternatively, the present invention may be applied to any other devices and pieces of equipment insofar as a target component can be removed from and/or installed on them. According to such an alternative, operations that are displayed may be related to components to be assembled or installed, rather than components to be repaired.

In the above embodiment, the moving-image data D1 are data of an electronic manual which explains the removal of target components (the engine 70 and the EGR valve 72). However, moving-image data D1 may be data of an electronic manual which explains the installation of target components.

In the above embodiment, the moving-image data D1 basically do not contain speech data and text data. However, the moving-image data D1 may contain no speech data and text data at all or may contain at least one of speech data and text data.

In the above embodiment, the program of the ECU is updated using the updating program P1 and the EGR valve 72 is replaced. However, the present invention is applicable to the replacement, installation, or removal of other components. If defective components need to be replaced with new components with corrected defects, then the new components have to be delivered to dealers in other countries in advance.

In the above embodiment, the screens showing the first operation scene Sc1 and the second operation scene Sc2 are displayed in grayscale. However, they may be displayed in shades of other single colors (e.g., dark blue, blue, and green). If other colors are used, then the color of the background of the screens may be adjusted. For example, the background may be displayed in black and the lines in yellow.

Figure 26:
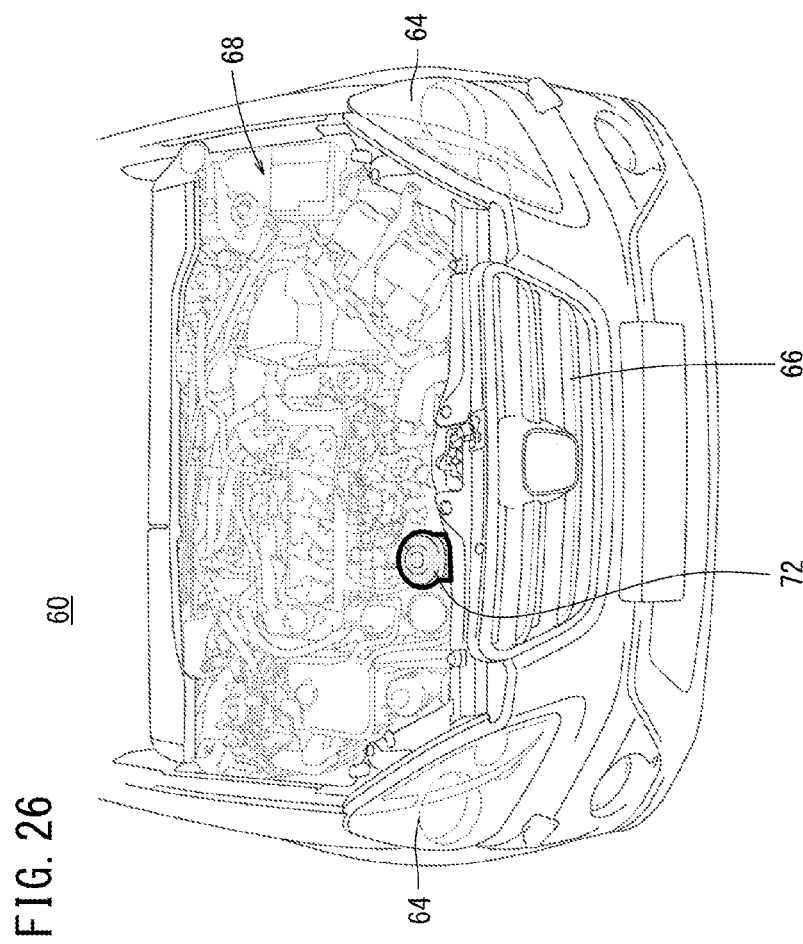
FIG. 26 is a diagram showing a displayed marking according to a modification.

In the above embodiment, the positions of operation spots on target components and the directions along which to move target components or operation spots are highlighted by markings such as red arrows 74 and white arrows 80. However, they may be highlighted by either red arrows 74 or white arrows 80. Alternatively, target components may be indicated by red thick lines that are displayed as blinking, for example, rather then arrows (see FIG. 26).

In the above embodiment, an electronic mail is sent to indicate a method of acquiring the moving-image data D1 to the terminal 12, and the terminal 12 then access the server 16 to download the moving-image data D1. However, the moving-image data D1 may be attached to the electronic mail, for example.

In the above embodiment, the terminal 12 itself which has received an electronic mail accesses the server 16. However, a terminal 12 which is different from the terminal 12 which has received an electronic mail may access the server 16 to download the moving-image data D1.

In the above embodiment, the moving-image data D1 is stored in the memory device 28, and the stored moving-image data D1 is played back. However, the moving-image data D1 may not be stored in the memory device 28, but the terminal 12 may be positioned in the vicinity of the car 60 for replacement of the EGR valve 72, so that the EGR valve 72 can be replaced while the terminal 12 is downloading the moving-image data D1.

The invention claimed is:

1. An operation sequence display method for sequentially displaying a series of operation procedures to remove, install, or remove and install a plurality of target components included in an apparatus, on a monitor controlled by a computer, comprising:

displaying, on the monitor, at least one operation scene showing installation or removal of one or more of the target components;

displaying, in the operation scene, the target components and other surrounding components differently in monochromatic shades;

making a displayed marking blink by serially repeating displaying and hiding of the marking at predetermined constant intervals in the operation scene, the displayed marking comprising an arrow for highlighting the one or more target components or an operation spot on the one or more target components to be moved in association with the installation or removal operation; and after the blinking of the displayed marking is over, displaying, in the operation scene, an animation showing a movement of the highlighted one or more target components or the operation spots;

wherein the movement of the one or more target components or the operation spot is displayed in a constant rhythm; and wherein the blinking rhythm of repeating displaying and hiding of the marking at the predetermined constant intervals and the running rhythm of the animation are set to a common rhythmic base.

2. The operation sequence display method according to claim 1, further comprising:

selectively displaying a plurality of operation scenes; and switching from one of the operation scenes to another of the operation scenes by fading out the one of the operation scenes in timed relation to the rhythmic base common to the blinking of the displayed marking, and thereafter fading in the other of the operation scenes in timed relation to the rhythmic base common to the blinking of the displayed marking.

3. The operation sequence display method according to claim 1, wherein if a concealing component is positioned in front of and hides the operation spot on the one or more target components, the concealing component has only outer contour lines displayed, thereby displaying the operation spot as being seen through the concealing component.

4. An operation sequence display system for sequentially displaying a series of operation procedures to remove, install, or remove and install a plurality of target components included in an apparatus, wherein the operation sequence display system comprises:

a monitor;

at least one processor; and at least one memory including computer program code, the at least one memory and the computer program code configured, with the at least one processor, to cause the operation sequence display system at least to:

display, on the monitor, at least one operation scene showing installation or removal of one or more of the target components;

display, in the operation scene, the one or more target components and other surrounding components differently in monochromatic shades;

make a displayed marking blink by serially repeating displaying and hiding of the marking at predetermined constant intervals in the operation scene, the displayed marking comprising an arrow for highlighting the one or more target components or an operation spot on the one or more target components to be moved in association with the installation or removal operation; and after the blinking of the displayed marking is over, display, in the operation scene, an animation showing a movement of the highlighted one or more target components or the operation spot;

wherein the movement of the one or more target components or the operation spot is displayed in a constant rhythm; and wherein the blinking rhythm of repeating displaying and hiding of the marking at the predetermined constant intervals and the running rhythm of the animation are set to a common rhythmic base.

\* \* \* \* \*